United States Patent

Epshetsky et al.

(10) Patent No.: US 9,228,658 B2
(45) Date of Patent: Jan. 5, 2016

(54) PUMPING SEAL WITH ALIGNED SPRING

(71) Applicants: Yefim Epshetsky, Schaumburg, IL (US); Alex Paykin, Buffalo Grove, IL (US)

(72) Inventors: Yefim Epshetsky, Schaumburg, IL (US); Alex Paykin, Buffalo Grove, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/367,084

(22) PCT Filed: Dec. 14, 2012

(86) PCT No.: PCT/US2012/069737
§ 371 (c)(1),
(2) Date: Jun. 19, 2014

(87) PCT Pub. No.: WO2013/096119
PCT Pub. Date: Jun. 27, 2013

(65) Prior Publication Data
US 2015/0008645 A1 Jan. 8, 2015

Related U.S. Application Data

(60) Provisional application No. 61/578,469, filed on Dec. 21, 2011.

(51) Int. Cl.
*F16J 15/32* (2006.01)
(52) U.S. Cl.
CPC .............. *F16J 15/32* (2013.01); *F16J 15/3208* (2013.01); *F16J 15/3212* (2013.01); *F16J 15/3244* (2013.01)

(58) Field of Classification Search
CPC ...... F16J 15/32; F16J 15/3208; F16J 15/3244
See application file for complete search history.

(56) References Cited

U.S. PATENT DOCUMENTS

| 3,586,342 | A  | * | 6/1971  | Staab | 277/559 |
| 6,729,624 | B1 | * | 5/2004  | Johnston | 277/560 |
| 2004/0227304 | A1 | * | 11/2004 | Kern et al. | 277/559 |
| 2006/0214380 | A1 | * | 9/2006  | Dietle et al. | 277/559 |
| 2011/0316235 | A1 | * | 12/2011 | Epshetsky | 277/300 |

* cited by examiner

*Primary Examiner* — Gilbert Lee
(74) *Attorney, Agent, or Firm* — Mark Ussai; SKF USA Inc. Patent Dept.

(57) ABSTRACT

A seal assembly for sealing a space between a housing and a rotary shaft includes a generally annular sealing member having a central axis and inner and outer circumferential surfaces extending about the axis, at least a portion of the inner surface providing a sealing surface engageable with the shaft outer surface so as to define a seal interface with opposing axial ends. The sealing surface is configured to direct substances entering the interface toward at least one of the axial ends. Further, an annular biasing member is disposed about the sealing member outer surface and configured to exert a radially-inwardly directed force on the sealing member so as to generate contact pressure within the seal interface. The biasing member is arranged on the sealing member such that at least a portion of the biasing member extends axially in general alignment with at least a portion of the sealing surface.

12 Claims, 3 Drawing Sheets

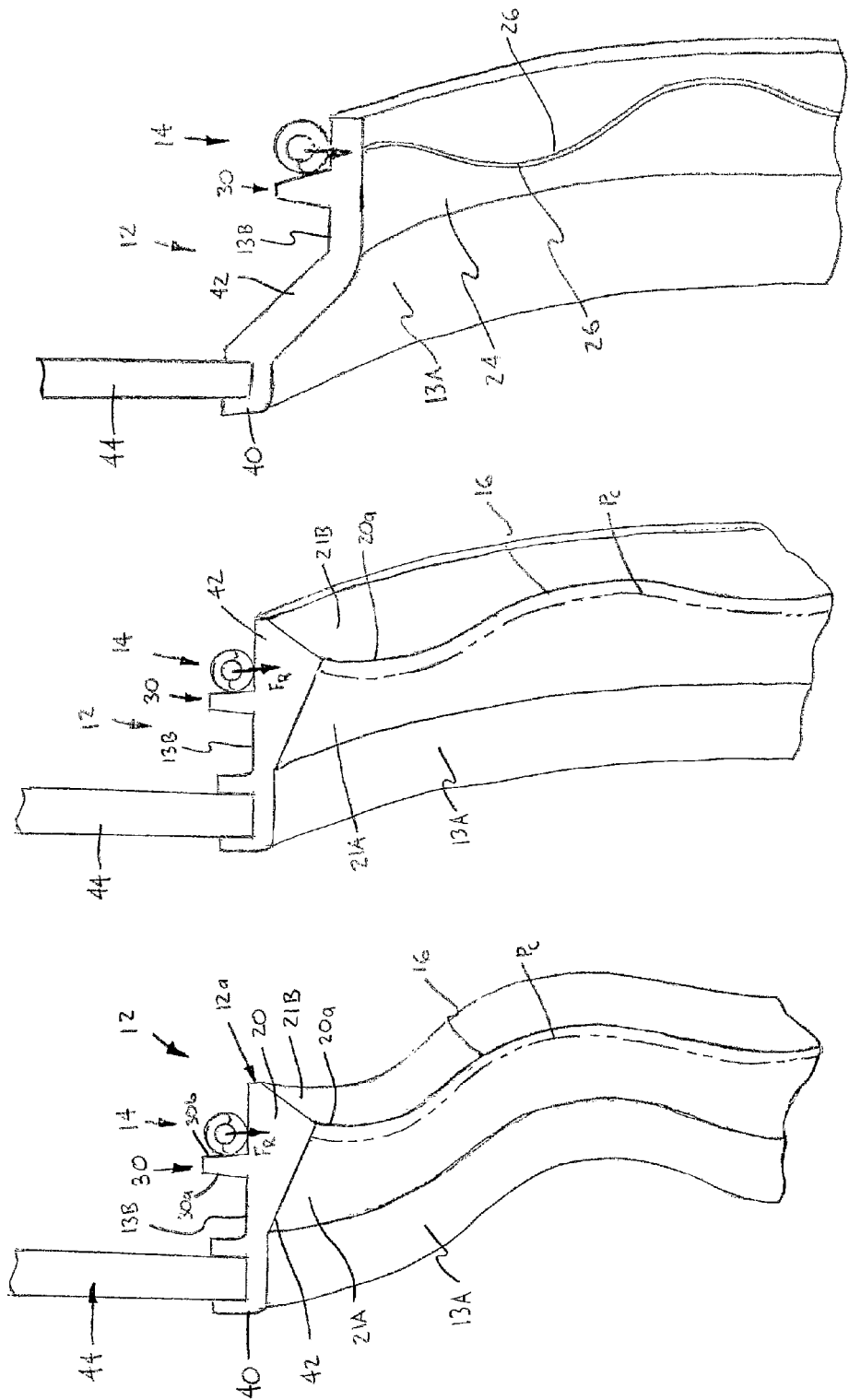

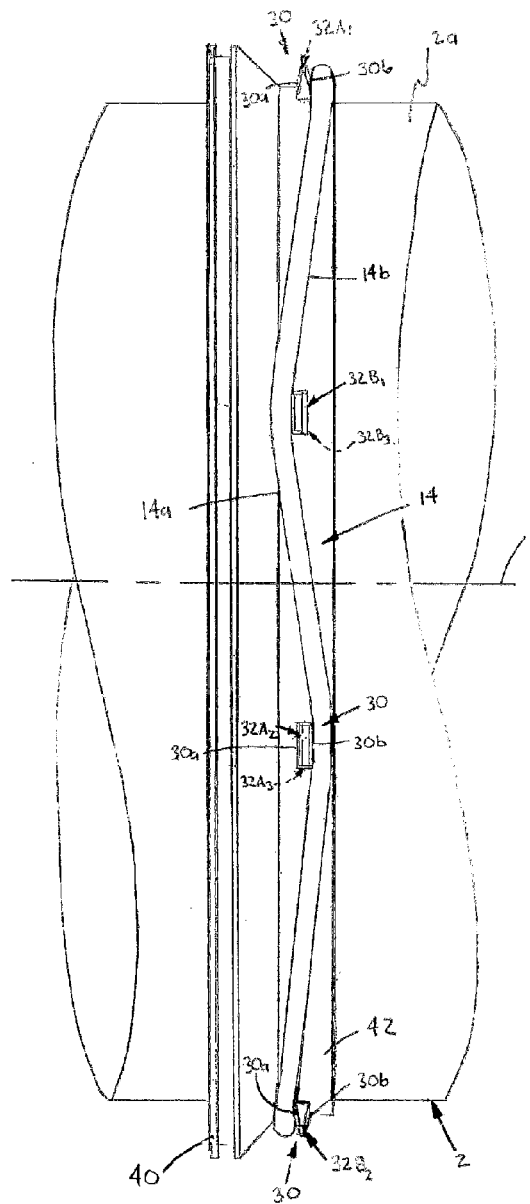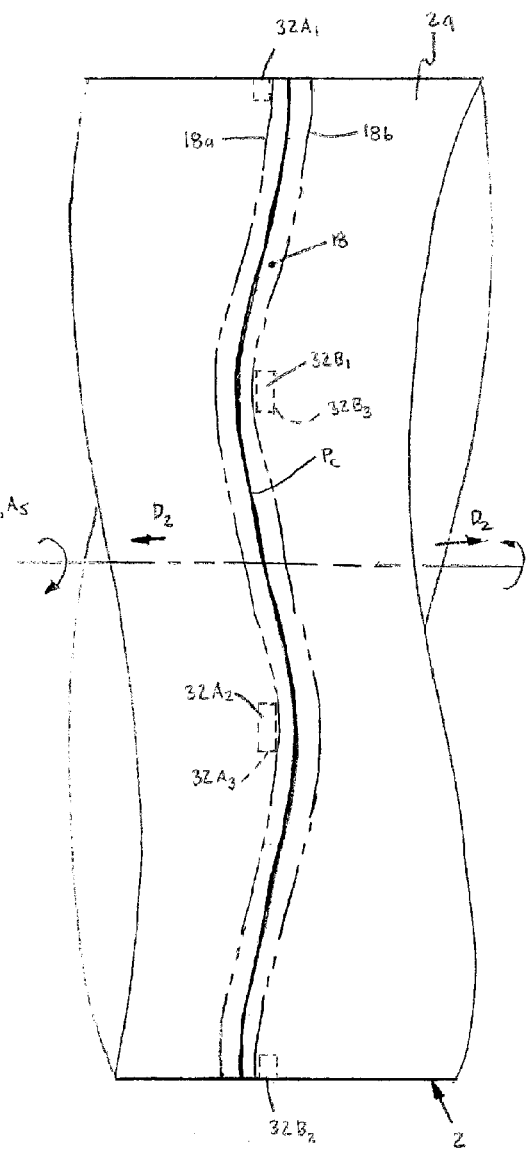
FIG. 5                    FIG. 6

US 9,228,658 B2

PUMPING SEAL WITH ALIGNED SPRING

BACKGROUND OF THE INVENTION

The present invention relates to seals, and more particularly to radial seals for sealing a space about a rotatable shaft.

Radial shaft seals are generally known and typically include a seal member with an inner circumferential "sealing surface", which may be provided by an annular lip or a cylindrical portion of the seal member, that is engageable with the exterior surface of a shaft. As the shaft rotates within the seal, the sealing surface remains in sliding contact with the shaft outer surface to prevent the migration of substances (e.g., oil, debris particles) through a sealed space. Typically, to provide sufficient sealing pressure and to account for variations in the shaft and seal dimensions and/or misalignments, such seal assemblies are often provided with a biasing member (e.g., a garter spring) to "force" the seal member into engagement with the shaft.

Further, some seal assemblies are provided with a seal member having a formed surface (e.g., sine wave-shaped) that creates a "pumping effect" to remove any substances that become disposed between the sealing surface and the shaft surface. Typically, such pumping seal assemblies are more costly to manufacture than a conventional "non-pumping" seal assembly due to the additional fabrication necessary to create the pumping effect.

SUMMARY OF THE INVENTION

In one aspect, the present invention is a seal assembly for sealing a space between a housing and a rotary shaft having an outer surface and disposed at least partially within the housing. The seal assembly comprises a generally annular sealing member having a central axis and inner and outer circumferential surfaces extending about the axis, at least a portion of the inner surface providing a sealing surface engageable with the shaft outer surface so as to define a seal interface with opposing axial ends. The sealing surface is configured to direct substances entering the interface toward at least one of the axial ends. Further, a generally annular biasing member is disposed about the sealing member outer surface and configured to exert a radially-inwardly directed force on the sealing member so as to generate contact pressure within the seal interface. The biasing member is arranged on the sealing member such that at least a portion of the biasing member extends axially in general alignment with at least a portion of the sealing surface.

In another aspect, the present invention is a method of pumping fluid with a seal assembly for sealing a space between a rotatable shaft and a housing. The pumping method comprises the steps of: providing a generally annular sealing member having a central axis, inner and outer circumferential surfaces, at least a portion of the inner surface providing a sealing surface engageable with the shaft outer surface so as to define a seal interface with opposing axial ends, the sealing surface being configured to direct substances entering the interface toward at least one of the axial ends; providing a generally annular biasing member configured to exert a radially-inwardly directed force when deflected radially outwardly; mounting the sealing member on the shaft such that the sealing surface is engaged with the outer surface of the shaft; mounting the biasing member on the sealing member such that the biasing member such that at least a portion of the biasing member extends axially in alignment with at least a portion of the sealing surface; and rotating the shaft within the seal such that the sealing surface directs any fluid entering the seal interface toward a proximal one of the two axial ends of the sealing surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2 is a broken-away side view in partial cross-section of a portion of a sealing member of a radial lip seal and a biasing member, shown with a sinusoidal lip formed by deformation;

FIG. 3 is a broken-away side view in partial cross-section of a portion of a sealing member of a radial lip seal and a biasing member, shown with a sinusoidal lip formed by molding;

FIG. 4 is a broken-away side view in partial cross-section of a portion of a sealing member of a wafer seal and a biasing member, shown with a sinusoidal projection;

FIG. 5 is a side view of a sealing member and the biasing member as mounted on a shaft, shown separate from the casing; and FIG. 6 is more diagrammatic view of the seal assembly having the sealing member of FIG. 5, depicting the contact pressure profile within the seal interface.

DETAILED DESCRIPTION OF THE INVENTION

Figure 1:
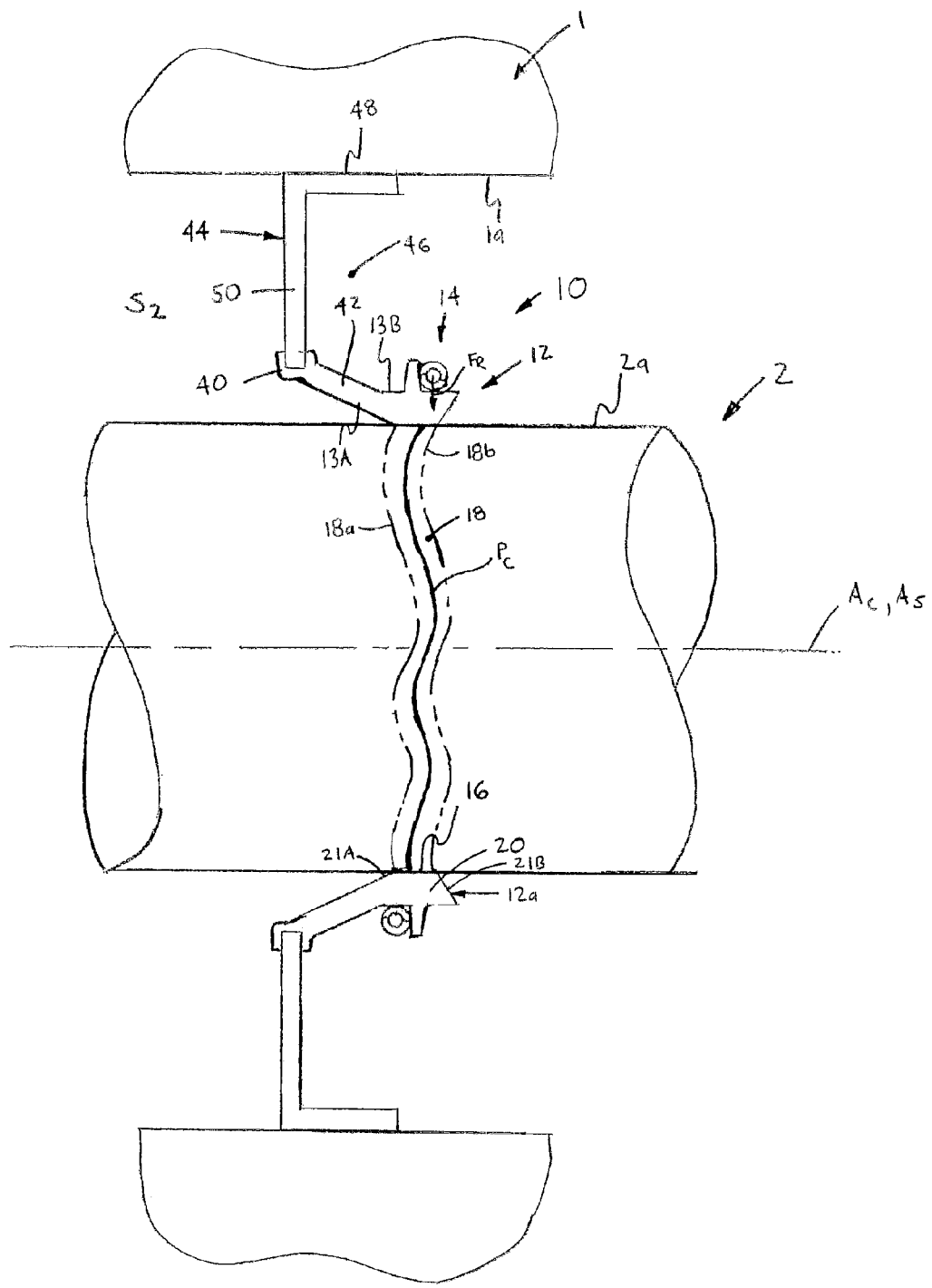
FIG. 1 is an axial cross-section of a seal assembly in accordance with the present invention, shown as a radial shaft seal.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" or "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a seal assembly 10 for sealing a space between a housing 1 and a rotary shaft 2 having a central axis $A_C$ and an outer surface 2a, the shaft 2 being disposed at least partially within the housing 1 and rotatable about the axis $A_C$. The seal assembly 10 basically comprises a generally annular sealing member 12 and a generally annular biasing member 14 disposed about the sealing member 12. The sealing member 12 has a central axis $A_S$ and inner and outer circumferential surfaces 13A, 13B, respectively, extending about the axis $A_S$. At least a portion of the inner surface 13A provides a sealing surface 16 engageable with the shaft outer surface 2a so as to define a seal interface 18 with opposing axial ends 18a, 18b. Further, the sealing surface 16 is configured to direct substances entering the interface 18 toward at least one of the axial ends 18a, 18b, as discussed in detail below.

Furthermore, the biasing member 14 is disposed about the sealing member outer surface 13B and is deflectable (i.e., expandable or "stretchable") in a radially-outward direction. Being deflectable/expandable in this manner, the biasing member 14 is thereby configured to exert a radially-inwardly directed force $F_R$ on the sealing member 12 so as to generate contact pressure $P_C$ within the seal interface 18. Preferably, the biasing member 14 is a garter spring, but may alternatively be an elastomeric ring or any other component capable of functioning generally as described herein. Further, the biasing member 14 is arranged on the sealing member 12 such that at least a portion of the biasing member 14 extends axially in general alignment with, i.e., "in-phase" with, at least a portion of the sealing surface 16.

In certain preferred constructions, the sealing surface 16 is generally sinusoidal-shaped and the biasing member 14 extends in a generally sinusoidal pattern about the sealing member outer surface 13B so as to be substantially aligned with and spaced radially outwardly from the sealing surface 16, as depicted in FIGS. 1-6. In other preferred constructions (not depicted), the sealing surface 16 is generally elliptical-shaped and the biasing member 14 is arranged to extend in a generally elliptical pattern about the sealing member outer surface 13B so as to be substantially aligned with and spaced radially outwardly from the sealing surface 16. In any case, by aligning the biasing member 14 with the sealing surface 16, the contact pressure $P_C$ generated by the biasing member 14 extends along the axial sections of the sealing surface 16 that direct or displace substances in an axial direction $A_1$ or $A_2$, thereby increasing the pumping ability or efficiency of the seal assembly 10, as discussed in greater detail below.

Referring to FIGS. 1-3, preferably, the seal assembly 10 is a radial shaft seal or radial "lip" seal with a sealing member 12 having an engagement portion 20 proximal one axial end 12a and extending radially inwardly from a remainder of the sealing member 12. The engagement portion 20 is preferably formed having generally converging sidewalls 21A, 21B which extend to an inner radial end or lip 20a providing the sealing surface 16, and thus has generally triangular-shaped axial cross-sections. The engagement portion 20 is either arranged/positioned (e.g., by deflection or deformation; see FIG. 2) or formed (e.g., molded, cut, etc.; see FIG. 3) such that the inner end 20a extends either generally elliptically or generally sinusoidally about the central axis $A_C$, thereby providing a correspondingly shaped sealing surface 16, as shown in FIGS. 2 and 3.

As shown in FIG. 4, the seal assembly 10 may be formed as a "wafer" seal, in which case the sealing member inner surface 13A has a generally cylindrical surface portion 24 engaged with the shaft outer surface 2a. The sealing member 12 may have at least one projection or bead 26 extending radially inwardly from the cylindrical surface portion 24 and having a free end providing the sealing surface 16. Preferably, each of the one or more beads 26 extends either generally elliptically or generally sinusoidally about the central axis $A_S$. Alternatively, the sealing member 26 may be formed with one or more cuts or grooves (not shown) extending radially outwardly from the cylindrical surface portion 24, in which case the surface portion 24 itself provides the primary sealing surface 16.

With either the radial shaft/lip seal or the wafer seal, the portions of the lip, projection or groove/cut that extend axially will divert or direct any substances within the seal interface 18 toward one of the interface axial ends 18a, 18b thereof during rotation of the shaft 2, as is well known to those skilled in the sealing art. As such, the detailed discussion of the functioning of "pumping" seals is unnecessary and beyond the scope of the present disclosure. Further, with the seal assembly 10 of the present invention, the alignment of the biasing member 14 with at least axially-extending sections of the sealing surface 16 or pumping beads/groove(s), causes the contact pressure $P_C$ exerted by the biasing member 14 to assist in directing or "pushing" substances axially from the seal interface 18. Thus, the rate of removal of substances from the seal interface 18 is increased, thereby increasing the efficiency of the seal assembly 10.

Referring again to FIGS. 1-6, in a presently preferred construction, the sealing member 12 further includes a plurality of projections 30 extending generally radially outwardly from the outer surface 13B and spaced circumferentially apart about the central axis $A_S$. Each projection 30 is preferably formed as a generally rectangular tab having opposing circumferentially-extending radial surfaces providing opposing first and second ends 30a, 30b, and the plurality of projections 30 define at least one first projection 32A and at least one second projection 32B. With such projections 30, the biasing member 14 is arranged on the sealing member 12 with a first end 14a of the biasing member 14 contacting the second end 30b of each first projection 32A and a second end 14b of the biasing member 14 contacting the first end 30a of each second projection 32B, as best shown in FIG. 5. As such, the biasing member 14 extends axially and circumferentially between the first and second projections 32A, 32B so that the contact pressure $P_C$ extends at least partially axially between the seal interface ends 18a, 18b, and is at least generally aligned with the sealing surface 16, as described in further detail below.

As discussed above, in certain preferred constructions, the sealing surface 16 extends generally sinusoidally about the central axis $A_S$. To align the biasing member 14 with the sealing surface 16, the plurality of projections 30 includes at least four projections circumferentially spaced apart about the central axis $A_S$ and providing at least two first projections 32A and at least two second projections 32B, as shown in FIGS. 4 and 5. The biasing member 14 is bended about each one of the projections 30 so as to extend generally sinusoidally about the central axis $A_S$, such that the contact pressure $P_C$ is exerted generally sinusoidally and generally along the sealing surface 16. For example, the plurality of projections 30 may include six projections spaced circumferentially apart by about sixty degrees (60°) and providing three first projections $32A_1$, $32A_2$, $32A_3$ and three second projections $32A_1$, $32B_2$, $32B_3$, as shown in FIGS. 4 and 5. Further for example, the plurality of projections 30 may include four projections circumferentially spaced apart by about ninety degrees (90°) and providing two first projections $32A_1$, $32A_2$ and two second projections $32B_1$, $32B_2$ (not depicted).

Alternatively, the sealing member 12 may be formed such that the sealing surface 16 extends generally elliptically about the central axis $A_S$ (structure not shown). In such constructions, to align the biasing member 14 with the sealing surface 16, the plurality of projections 30 preferably include two projections 30 spaced apart circumferentially by about one hundred eighty degrees (180°) and providing one first projection 32A and one second projection 32B. The biasing member 14 is positioned by the two projections 32A, 32B so as to extend generally elliptically about the central axis $A_S$, such that the contact pressure $P_C$ is exerted generally elliptically and along the sealing surface 16. Although only sealing members 12 with two, four or six projections are discussed and or described herein, the sealing member 12 may be formed with any other appropriate number of projections 30 as is necessary to align the biasing member 14 with the sealing surface 16.

Referring now to FIGS. 1-4, the sealing member 12 preferably includes a base portion 40 coupleable with the housing 1, preferably through a casing 44, and a cantilever portion 42 connected with the base portion 42 and providing the inner and outer circumferential surfaces 13A, 13B and the plurality of projections 30. The cantilever portion 42 is deflectable relative to the base portion 40 and the biasing member 14 is configured to bias the cantilever portion 42 generally radially inwardly so as to maintain contact between the sealing surface 16 and the shaft outer surface 2a. Although preferably including base and cantilever portions 40, 42, the sealing member 12 may be formed in any other appropriate manner that enables the seal assembly 10 to function generally as described herein.

Referring particularly to FIG. 1, as noted above, the seal assembly 10 preferably further comprises the casing 44, which is preferably generally annular and has an interior cavity 46 configured to receive the sealing member base portion 40 and an outer circumferential surface 48 engageable with an inner circumferential surface 1a of the housing 1 so as to couple the sealing member 12 with the housing 1. Preferably, the casing 44 has a generally radially-inwardly extending shoulder 50 with a central opening sized to receive the shaft 2, the sealing member 12 being attached to the shoulder 50, and most preferably bonded thereto. Furthermore, the casing 44 is preferably formed of a metallic material, such as low carbon steel, and the sealing member 12 is preferably formed of an elastomeric material, such as natural or synthetic rubber, particularly when constructed as a radial shaft/lip seal, or another polymer such as PTFE or Nitrile, particularly when formed as a wafer seal.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A seal assembly for sealing a space between a housing and a rotary shaft having an outer surface and disposed at least partially within the housing, the seal assembly comprising:
    a generally annular sealing member having a central axis and inner and outer circumferential surfaces extending about the axis, at least a portion of the inner surface providing a sealing surface engageable with the shaft outer surface so as to define a seal interface with opposing axial ends, the sealing surface being configured to direct substances entering the interface toward at least one of the axial ends; and
    a generally annular biasing member disposed about the sealing member outer surface and configured to exert a radially-inwardly directed force on the sealing member so as to generate contact pressure within the seal interface, the biasing member being arranged on the sealing member such that at least a portion of the biasing member extends axially in general alignment with at least a portion of the sealing surface;
    wherein one of:
    the sealing surface is generally elliptical shaped and the biasing member extends in a generally elliptical pattern about the sealing member outer surface so as to be substantially aligned with and spaced radially outwardly from the sealing surface; and
    the sealing surface is generally sinusoidal-shaped and the biasing member extends in a generally sinusoidal pattern about the sealing member outer surface so as to be substantially aligned with and spaced radially outwardly from the sealing surface.

2. The seal assembly as recited in claim 1 wherein the sealing member has an engagement portion extending radially inwardly from a remainder of the sealing member, the engagement portion having generally triangular-shaped axial cross-sections and an inner radial end providing the sealing surface, the engagement portion being formed such that the inner end extends one of generally elliptically about the central axis and generally sinusoidally about the central axis.

3. The seal assembly as recited in claim 1 wherein the sealing member inner surface has a generally cylindrical surface portion and the sealing member further has a projection extending radially inwardly from the cylindrical surface portion and having a free end providing the sealing surface, the projection extending one of generally elliptically about the central axis and generally sinusoidally about the central axis.

4. The seal assembly as recited in claim 1 wherein:
    the sealing member further includes a plurality of projections extending generally radially outwardly from the outer surface and spaced circumferentially apart about the central axis, each projection having opposing first and second axial ends and the plurality of projections defining at least one first projection and at least one second projection; and
    the biasing member has opposing first and second ends and is arranged on the sealing member with the biasing member first end contacting the second end of each first projection and the biasing member second end contacting the first end of each second projection such that the biasing member extends axially and circumferentially between the first and second projections such that the contact pressure extends at least partially axially between the seal interface ends.

5. The seal assembly as recited in claim 4 wherein the sealing surface extends generally elliptically about the central axis, the plurality of projections includes two projections spaced apart circumferentially by about one hundred eighty degrees and providing one first projection and one second projection, the biasing member being positioned by the projections so as to extend generally elliptically about the central axis such that the contact pressure is exerted generally along the sealing surface.

6. The seal assembly as recited in claim 4 wherein the sealing surface extends generally sinusoidally about the central axis, the plurality of projections includes at least four projections circumferentially spaced apart about the central axis and providing at least two first projections and at least two second projections, the biasing member being bended about each one of the projections so as to extend generally sinusoidally about the central axis such that the contact pressure is exerted generally along the sealing surface.

7. The seal assembly as recited in claim 6 wherein one of
    the plurality of projections includes four projections circumferentially spaced apart by about ninety degrees and providing two first projections and two second projections; and
    the plurality of projections includes six projections spaced circumferentially apart by about sixty degrees and providing three first projections and three second projections.

8. The seal assembly as recited in claim 4 wherein each projection is formed as a generally rectangular tab having opposing circumferentially-extending radial surfaces providing the first and second ends.

9. The seal assembly as recited in claim 1 wherein the sealing member includes a base portion coupleable with the housing and cantilever portion connected with the base portion and providing the inner circumferential sealing surface and the outer circumferential surface, the cantilever portion being deflectable relative to the base portion and the biasing member being configured to bias the cantilever portion generally radially inwardly so as to maintain contact between the sealing surface and the shaft outer surface.

10. The seal assembly as recited in claim 1 wherein the biasing member is one of a garter spring and an elastomeric ring.

11. The seal assembly as recited in claim 1 further comprising a generally annular casing having an interior cavity configured to receive the sealing member base and an outer circumferential surface engageable with an inner circumferential surface of the housing so as to couple the sealing member with the housing.

12. A method of pumping fluid with a seal assembly for sealing a space between a rotatable shaft and a housing, the pumping method comprising the steps of:

providing a generally annular sealing member having a central axis, inner and outer circumferential surfaces, at least a portion of the inner surface providing a sealing surface engageable with the shaft outer surface and so as to define a seal interface with opposing axial ends, the sealing surface being configured to direct substances entering the interface toward at least one of the axial ends; and providing a generally annular biasing member configured to exert a radially-inwardly directed force when deflected radially outwardly;

mounting the sealing member on the shaft such that the sealing surface is engaged with the outer surface of the shaft;

mounting the biasing member on the sealing member such that the biasing member such that at least a portion of the biasing member extends axially in alignment with at least a portion of the sealing surface; and rotating the shaft within the seal such that the sealing surface directs any fluid entering the seal interface toward a proximal one of the two axial ends of the sealing surface;

wherein one of:

the sealing surface is generally elliptical shaped and the biasing member extends in a generally elliptical pattern about the sealing member outer surface so as to be substantially aligned with and spaced radially outwardly from the sealing surface; and the sealing surface is generally sinusoidal-shaped and the biasing member extends in a generally sinusoidal pattern about the sealing member outer surface so as to be substantially aligned with and spaced radially outwardly from the sealing surface.

* * * * *